June 9, 1936.  E. GEIGER  2,043,699
ELECTRICAL CONTROL MECHANISM
Filed Dec. 31, 1928  6 Sheets-Sheet 1

Fig. 1.

INVENTOR
Ernst Geiger
BY
Franklin J. Foster
ATTORNEY

June 9, 1936.  E. GEIGER  2,043,699
ELECTRICAL CONTROL MECHANISM
Filed Dec. 31, 1928  6 Sheets-Sheet 2

Fig. 2.

INVENTOR
Ernst Geiger
BY
Franklin J. Foster
ATTORNEY

June 9, 1936.  E. GEIGER  2,043,699
ELECTRICAL CONTROL MECHANISM
Filed Dec. 31, 1928  6 Sheets-Sheet 6

INVENTOR
*Ernst Geiger.*
BY
*Franklin J. Foster*
ATTORNEY

Patented June 9, 1936

2,043,699

UNITED STATES PATENT OFFICE 2,043,699

ELECTRICAL CONTROL MECHANISM

Ernst Geiger, Irvington, N. J.

Application December 31, 1928, Serial No. 329,386

19 Claims. (Cl. 187—16)

The present invention is concerned with an electrical control apparatus which may have a wide range of utility but which is particularly adapted for starting, stopping and predetermining or controlling the range or amplitude of movement of a power driven controlled device.

A notable feature of the invention is the fact that the apparatus may be so conveniently adapted for either the remote or direct control of a widely diversified class of controlled devices. For instance, it is within the scope of the invention to directly or remotely control elevators, track-guided carriages of all types and numerous other mechanisms in which the controlled element may have merely rotary or oscillating movement as opposed to a translatory one, such purpose being typically exemplified by the motor driving tuning shaft on a radio set.

Preferably the control mechanism embodies a switch which is adapted to be driven from or in synchronism with the controlled device. The invention, therefore, considered from another aspect, involves not only the switch mechanism but the combination of such mechanism operative to set a driven device in motion and actuated from or in synchronism with the movement of said device to automatically stop such motion after the device has travelled through its preselected range.

It will be obvious that this combination may be usefully employed for either the remote or direct control of elevators and that it is particularly advantageous for remotely controlling the movement of endless chains of conveyors, such for instance as the chains of car parking cabins used in garages of the type shown in my prior Patent No. 1,636,600, dated July 19, 1927.

It will be recalled that this patent shows endless connected chains of orbitally movable car parking cabins and a motor mechanism for actuating the chains to bring any cabin of the series into register with the car receiving or car delivery floors of the garage. My power driven switching mechanism when used to control this type of apparatus preferably embodies a plurality of selectively operable switches corresponding to the cabins of the series. These switches in one position serve to start the motor and set the cabin train in motion. When the train is moved through a distance sufficient to bring the selected cabin into register with the selected cargo handling floor, the selected switch will automatically be thrown out and the motor stopped.

By using this type of control mechanism the use of special indicators for showing the exact positions of the cabins at all times relative to their points of cargo reception and delivery is rendered unnecessary, since the control mechanism itself provides a permanent visual indication of such positions.

When the endless train of controlled devices is reversible as to direction of movement the switch mechanism in association with a conventional direction controlling a switch will not only permit any device of the train to be moved through the shorter path to desired cargo-handling position but will afford a visual indication of the manner in which the direction switch should be thrown to select the shorter course.

Various types of supplemental or auxiliary mechanism associated with or related to the controlled member or a train of such members, may be electrically rendered active or inactive from the switch which controls the range of movement of the members.

Preferably a recording apparatus is operated as an incident of manually setting the individual switching elements of the master control switch. This recording apparatus is principally useful in garage work where cars are temporarily parked in the movable storage cabins and the parking charges determined by the particular length of time which may elapse between the reception and the delivery of a car. The recording mechanism, which is entirely automatic in operation, not only shows the amount due on each outgoing car, but serves as a complete permanent record of the car parking business done over any length of time.

The recording apparatus might of course be operated by means entirely independent of the main switch, but by rendering its operation automatic and throwing chart marking devices in and out of operative position as "In" and "Out" switches of the master control are manipulated, I effectively safeguard against the possible dishonesty or negligence of garage employees, simplify bookkeeping and provide a valuable permanent record of business done from which the special traffic problems of any individual garage may be worked out.

The switching mechanism and also the recording mechanism is of extremely simple, practical, rugged, durable construction, well suited to meet the requirements of economical manufacture, convenient installation and convenient manipulation.

The invention may be more fully understood from the following description in connection with the accompanying drawings, wherein.

For illustrative purposes only I have elected to show the control apparatus operatively associated with an elevator garage of the patented type above referred to, it being understood that the controlled apparatus may assume many forms without material alteration of the controlling apparatus and within the scope of the present invention.

Figure 1:
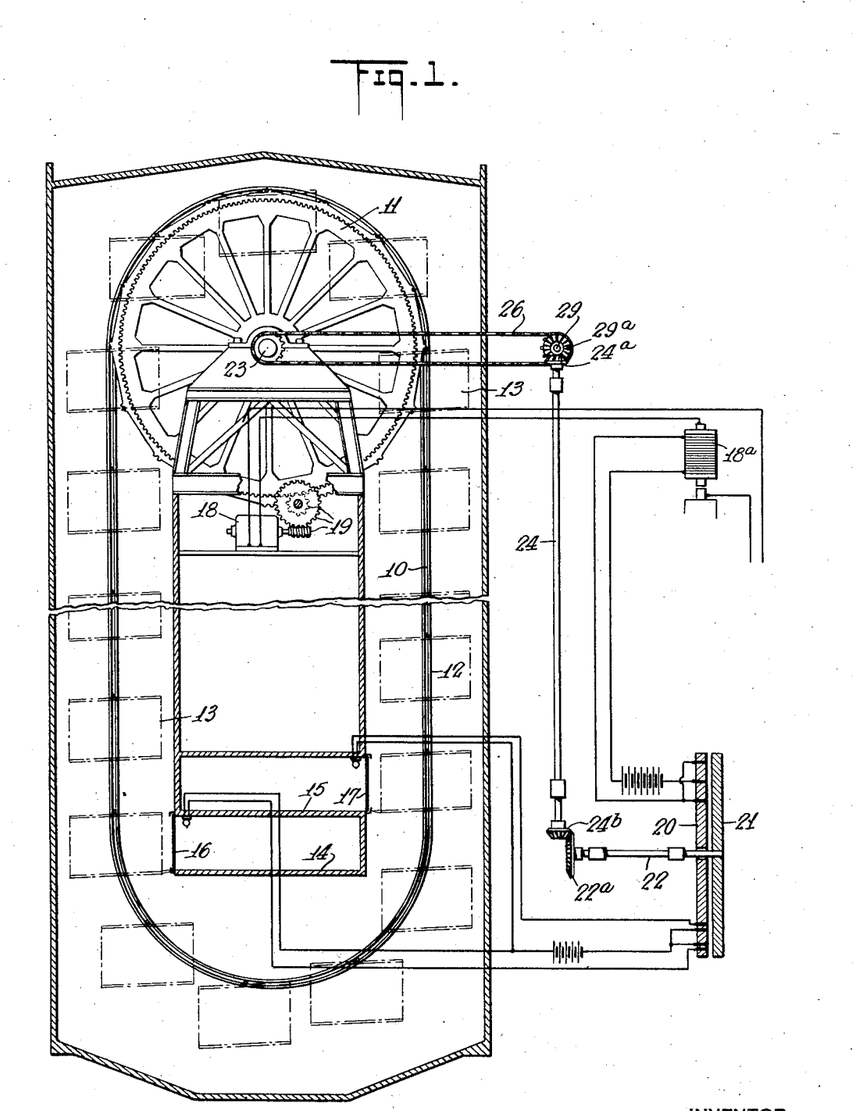
Fig. 1 is a diagrammatic sectional view showing an elevator garage equipped with my improved control mechanism.

Before describing the details of the switching mechanism it may be well to refer to Fig. 1 wherein I have diagrammatically illustrated an elevator garage layout with 10 representing an endless chain traveling over an upper sprocket wheel 11 and through a guide 12. Storage cabins 13 carried by the chain are adapted to be alined with car receiving floor 14 or delivery floor 15, passage of cars from floor to cabin and from cabin to floor being normally prevented by shaftway doors 16 and 17.

The driving motor 18 for the endless chain 10 is controlled from the master switch which includes the stationary backing plate 20 and the associated rotatable disc 21. Operative driving and speed reducing connections are schematically shown between driving shaft 22 of the switch and the axle 23 of the sprocket 11. I have shown a chain 26 transmitting movement from the axle 23 to a countershaft 29. A second vertical countershaft 24 includes pinion 24a at its upper end meshing with pinion 29a on the shaft 29 and pinion 24b at its lower end driving gear 22a fixed to the switch shaft 22. Operative connections between the motor 18 and the sprocket wheel rim are shown at 19. Obviously all of these driving connections are subject to complete redesign to meet special requirements. They are shown here only to show one operative combination of driven controlled device and synchronized master control.

Figure 2:
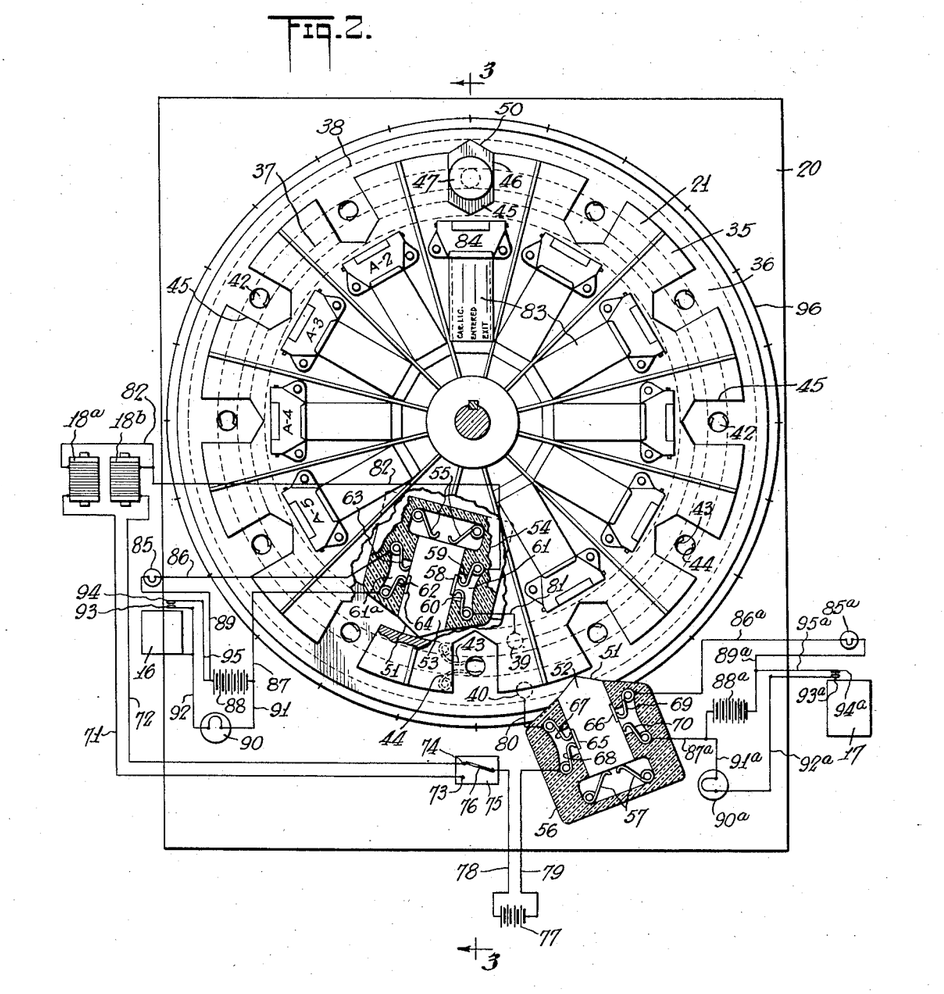
Fig. 2 is a somewhat diagrammatic view mainly in front elevation but partly in section through a master switch embodying the invention.
Figure 3:
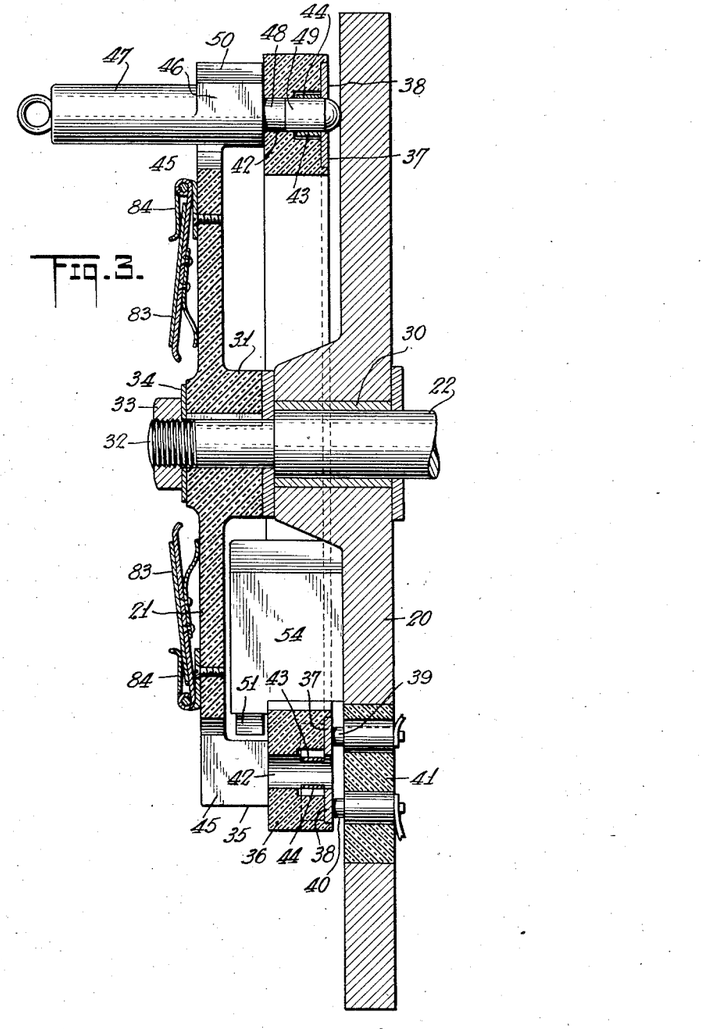
Fig. 3 is a sectional view on the line 3—3 of Fig. 2.

The master control in this case is settable to control the movement of any cabin on the chain to a position where it registers with either the receiving or delivery floor. A simple embodiment of this switch is shown in Figs. 2 and 3.

Stationary plate or disk 20 provides a bearing 30 for the shaft 22 and the hub 31 of movable disk 21 is secured on the reduced threaded end 32 of shaft 22 by a nut 33 and washer 34. Disk 21 is of insulating material and formed with a peripheral flange 35 turned back toward the plate 20. The flange carries an insulating ring 36, preferably integral with the flange. On the rear face of this ring are a pair of spaced annular contact strips 37, 38 engaged at all times by a pair of brushes 39, 40 mounted in an insulating block 41 in the plate 20.

At proper intervals about the ring 36 are transverse openings 42 and contact fingers 43, 44 from the annuli 37, 38 extend into these openings. The openings 42 are alined with cutout portions 45 in the disk 21 and its flange 35, such cutouts being adapted to receive the irregularly shaped shank 46 of a switch plug 47, the reduced end 48 of which enters one of the openings 42 and carries a metal ring 49 bridging contacts 43, 44. The shank 46 of the manually insertable switch plug 47 is provided at one side with a cam projection 50 adapted to coact with the wedge-shaped ends 51 of one or the other of a pair of slidable circuit breakers 52, 53, depending upon whether the switch plug is inserted in the movable disk 21 with the cam facing radially outwardly or radially inwardly. Due to the irregular and complementary configuration of shank 46 and cutouts 45, the switch plug must be inserted with its cam facing either radially inwardly or radially outwardly.

Circuit breaker 53 is mounted to slide in a suitable insulating guide or casing 54 mounted on the plate 20 within the ring 36.

This slide 53 is normally projected by springs 55 to move its wedge-shaped end 51 into the path of the cam 50, in the event that this cam is facing inwardly. If the cam faces outwardly the wedge shaped end 51 of circuit breaking slide 52 lies in its path, this slide being mounted in insulating guide or casing 56 corresponding to casing 54 but secured to plate 21 outwardly of ring 36. Springs 57 in casing 56 tend to project the slide 52 into the path of the cam 50.

In the outwardly projected position of slide 53 a contact plate 58 which it carries normally bridges a pair of contact fingers 59, 60 mounted in a pocket 61 at one side of the guide casing 54. Pairs of fingers 62, 63 in a pocket 61a at the opposite side of this casing however are adapted to be bridged by contact plate 64 only when the slide 53 is forced inwardly against the action of springs 55 and when the fingers 59 and 60 are open circuited due to inward movement of plate 58.

Similarly slide 52 carries contact plates 65 and 66. Plate 65 normally bridges fingers 67, 68 while plate 66 bridges fingers 69 and 70 only when the slide 52 is forced inwardly against the action of its springs 57.

Assume that motor 18 is adapted to drive the sprocket and chain of cabins in either clockwise or counter-clockwise directions respectively, depending upon which of the motor actuating relays 18a or 18b is energized. One side of each relay circuit connects through conductors 71, 72 with the terminals 73, 74 of a direction-controlling switch 75, the blade 76 of which may place either of these terminals in circuit with a battery or current source 77 through a lead 78. The relay circuit is completed by a lead 79 connected to opposite side of the battery to finger 68, the plate 65, lead 80 from finger 67 to brush 40, the annuli 37, 38 which are bridged by the switch plug 47, the lead 81 from brush 39 to finger 60, plate 58 and lead 82 from finger 59 to the relays 18a, 18b.

It will be understood that the number and arrangement of openings 42 in the disk 21 corresponds to the number and arrangement of cabins 13 on the chain 10 and that the circuit breakers 52, 53 occupy the same position relative to the series of openings 42 as do the loading and landing floors 14 and 15 relatively to the cabins on the chain.

Mounted on the face of the disk 21 and associated with each hole or plug socket 42 are carriers for identification cards 83. These carriers may be of any desired type such, for instance, as the spring clips 84 illustrated. Preferably they bear suitable legends, such as cabin "A—1"; "A—2", etc., and the cards which they carry are preferably duplicates of claiming tickets handed to the car owner when the car is received and may bear any suitable indicia such as owner's name, car license number, time and date of car reception, etc.

The presence or absence of tags 83 on the disk will always indicate which cabins are loaded and which cabins are empty. The operation is as follows: When a car enters the garage the attendant gives the driver a claiming ticket and inserts the duplicate therefor into one of the clips 84, say the clip for cabin A—4. While the owner is driving his car onto the receiving floor 14, the attendant notes position of the cabin A—4 relatively to the receiving floor by observation of the position of the clip A—4 in the disk, and sees that the shorter path for this cabin is in a counter-clockwise direction. He thereupon sets direction switch knife 76 and inserts the switch plug into the socket associated with clip A—4 with the cam facing inwardly. The insertion of the plug closes the circuit through motor relay 18b and starts the motor to set the chain 10 in motion in a counter-clockwise direction.

As the chain turns motion is imparted to the disk 21 through the power transmitting connections above described and the disk turns in a counter-clockwise direction. As the desired cabin A—4 reaches its position in front of the door 16 cam 50 will engage slide 53 and force it inwardly, thereby breaking motor relay circuit at 58, 60 and causing the motor to stop.

As circuit breaker 53 is forced inwardly the cam plate 64 bridges contacts 62, 63 and closes a circuit through a green signal light 85 above the door 16 to notify an attendant that the empty cabin is waiting to receive its car. This signal circuit is through lead 86 from lamp 85 to finger 63, lead 87 from finger 62 to battery 88 and lead 89 from battery 88 to lamp 85.

A red signal lamp 90 on the baseboard 20 is operative to show when the door 16 is open. This lamp is connected by lead 91 to battery 88 and by lead 92 to door-actuated movable switch point 93. A coacting stationary switch point 94 is connected to the other side of the battery by lead 95. Thus a circuit through lamp 90 is completed every time the door 16 is opened to close the circuit at 93, 94 and is broken again as the door is reclosed.

A similar operation occurs whenever a loaded cabin is to be brought to car discharging position at the delivery floor 15, except that in this case the proper ticket 83 is removed from its holder 84, the direction switch 75 is set, the switch plug is inserted in its socket with the cam facing outwardly to close the motor relay circuit and the motor runs to actuate the chain 10 and the disk 21 until the loaded cabin reaches its place before door 17 and the motor relay circuit is broken by the inward thrust of circuit breaker 52. Simultaneously a circuit through a green signal lamp 85a is completed through lead 86a, finger 69, plate 66, finger 70, lead 87a, battery 88a and lead 89a. As the door 17 is opened a circuit through a red signal lamp 90a on the base board 20 is completed through lead 92a, switch points 93a, 94a, lead 95a, battery 88a and lead 91a. This circuit is broken at 93a, 94a as the door is again closed.

To facilitate setting of the direction switch the disk 21 may be ringed with a circular scale 96 fixed on plate 20 and graduated in terms of feet from a central zero position midway of the two circuit breakers 52, 53. Optionally, however, this scale may simply have two colored semicircular halves and the switch points 74, 73 be similarly colored so that if the socket 42 of the desired cabin be on one half, say the red half of scale 96, the knife 75 is thrown onto red terminal 74, while if the socket is on the other or green half of the scale the knife is thrown onto green terminal 73.

In the present case I have utilized the simplest diagrammatic showing of circuits, but it will be evident that various supplemental signal circuits, door operating circuits, etc., might be controlled by either switch plug 47, circuit breakers 52, 53 or any required supplemental circuit-making and breaking mechanism associated with the master switch disk 21 and its backing board 20. Obviously relays 18a, 18b are of the two-way type which positively hold switches in the motor circuits closed while the relay circuits are closed and positively open these switches when the relay circuits are opened.

In order that the diagrammatic showing of Fig. 1 be as simple as possible I have there shown only one relay 18a, have omitted the direction switch 75, the red signal lamp circuits, and detailed showing of the master switch itself. The wiring connections in the diagrammatic Fig. 1 otherwise resemble the wiring of the master control switch illustrated in Figs. 6 to 8 inclusive.

Figures 4, 5:
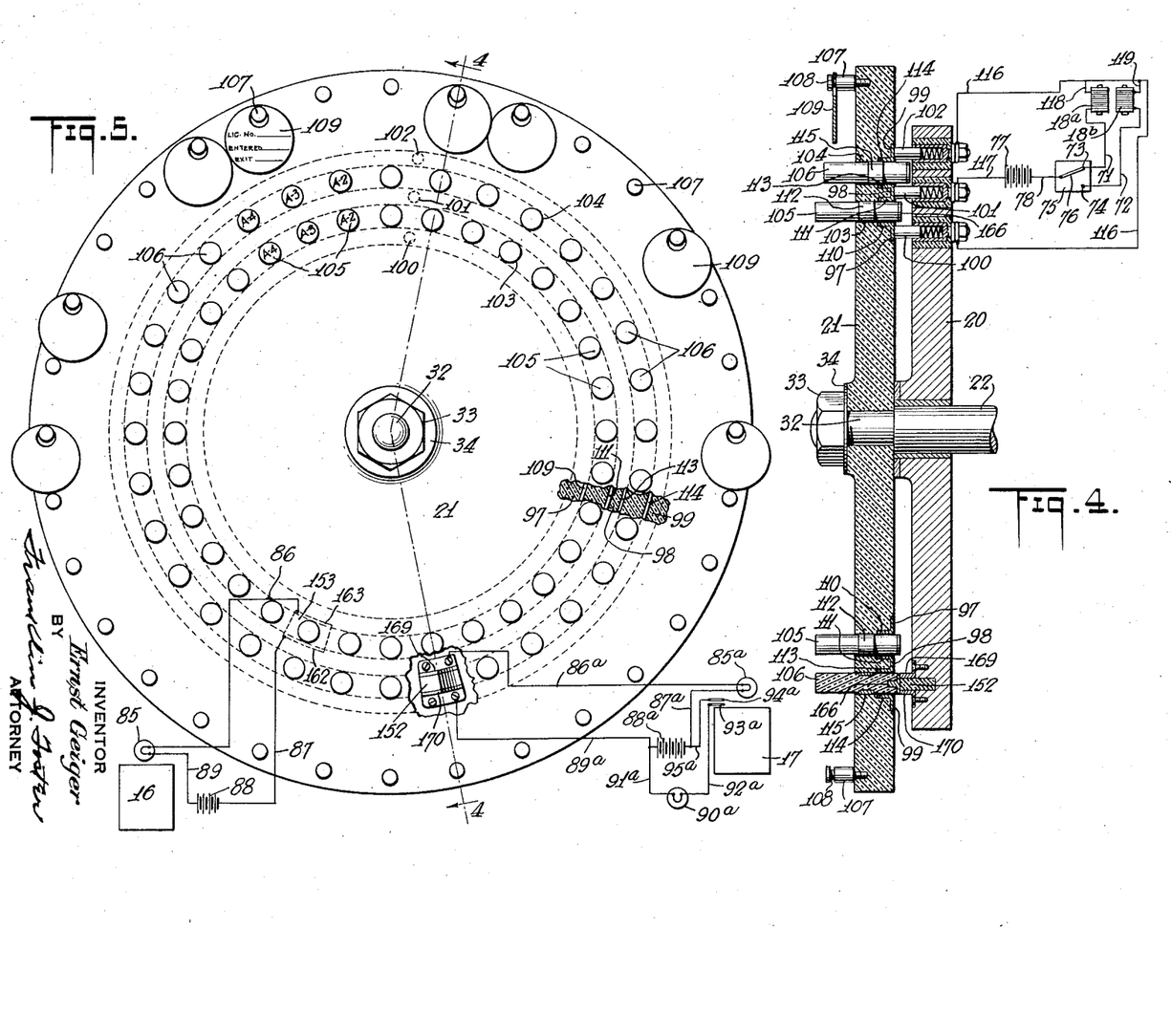
Fig. 4 is a similar view through a slightly modified form of switch, this view being taken on the line 4—4 of Fig. 5.
Fig. 5 is a view generally similar to Fig. 1 but showing the modified switch of Fig. 4.

In Figs. 4 and 5 I have illustrated a slight modification of the master switch details, and substituted pairs of push buttons for the reversible switch plug 47. Inasmuch as the general arrangement of circuits and switches remains substantially the same I have, wherever possible, designated parts by the same reference numerals as those displayed on similar or equivalent parts of Figs. 2 and 3.

Here the special flanged construction of disk 21 is omitted. Three annular contact strips 97, 98 and 99 are provided on the back of the disk, and brushes 100, 101, 102 on the plate 20 engage them. Instead of the single sockets 42 pairs of radially alined sockets 103, 104 are provided mounting respectively "In" or receiving pushbuttons 105 and "Out" or delivery push-buttons 106. Radially outwardly of each pushbutton pair is a stud 107 upon the reduced neck 108 of which an apertured identification check 109 may be hung and gravitationally held in upright readable position as the disk 21 rotates.

Fingers 110, 111 from contact strips 97, 98 project into sockets 103 to be bridged by metal rings 112 on the insulating "In" buttons 105 as they are pushed home. Similarly fingers 113, 114 project from rings 98, 99 into sockets 104 where they are bridged by contact bands 115 on push buttons 106 as the latter are thrust inwardly.

To avoid unnecessary detail I have omitted detailed showing of the conventional spring mechanism which holds the pushbuttons 105, 106 in their depressed or released positions and prevents both buttons of a single pair from being forced home at the same time.

In this instance, for obvious reasons, the motor relay circuits are made directly through the brushes. Brushes 100, 102 are connected by leads 116 having taps 118, 119 to relays 18a, 18b. Lead 117 connects brush 101 and the battery 77. The wiring is otherwise the same as Fig. 1, lead 78 connecting battery 77 and direction switch 75 and the switch knife 76 making contact on either point 73, 74 which serve as terminals for leads 71, 72 respectively to relays 18a, 18b.

With the direction switch in the position of Fig. 9 the relay circuit closed by depression of pushbutton 105 is as follows: battery 77, lead 78, knife 76, lead 71, relay 18a, leads 118 and 116, brush 100, ring 97, finger 110, band 112, finger 111, ring 98, brush 101 and back to the battery through lead 117.

If push button 106 is depressed the following relay circuit is completed. Battery 77, lead 78, knife 76, lead 71, relay 18a, lead 116, brush 102, ring 99, finger 114, band 115, finger 13, ring 98, brush 101, and back to battery through lead 117. A circuit through one relay 18a or 18b is always open at 73, 76 or 74, 76 as the case may be, and a circuit between the central ring 98 and one or the other of bands 97, 99 is always open since only one push-button of a pair can be depressed at one time.

Instead of using slides 52, 53 to break the relay circuits, I use ramps or cams 152, 153 to force the depressed push buttons outwardly and push the ring 115 or 112 as the case may be out of bridging position between their associated rings 98, 97 or 98, 99. These ramps or cams are fixed upon the base plate 20 and are of insulating material. As a push-button 105 rides up its ramp 153 a shoe 166 on this push-button, corresponding to plate 64 of Fig. 2 bridges fingers 162, 163 associated with the ramp and corresponding to fingers 62, 63 of Fig. 1, thereby closing the circuit through signal lamp 85, this circuit being identical with the green signal lamp circuit of Fig. 2 and similarly numbered.

Likewise the out ramp or cam 152 has associated fingers 169, 170 to be bridged by shoe 166 on pushbutton 106 and to energize an associated green signal light 85a above the delivery door 17.

The operation of this form of master switch so closely follows the operation of the form shown in Figs. 1 and 2 that a detailed description of operation would be for the most part repetitious. The only essential difference is that instead of inserting plug 46 and facing its cam outwardly or inwardly accordingly as a car is to be delivered or received, the proper "In" pushbutton 105 or "Out" pushbutton 106 is depressed, it being understood that such pushbuttons will be numbered or associated with the identifying marks 120 of the particular cabins whose positions they control.

In Figs. 6 to 10 inclusive I have illustrated a further modified form of master switch which not only controls the position of the cabins 13 but which records on a travelling record chart the exact periods of time during which each cabin has been loaded.

Figure 6:
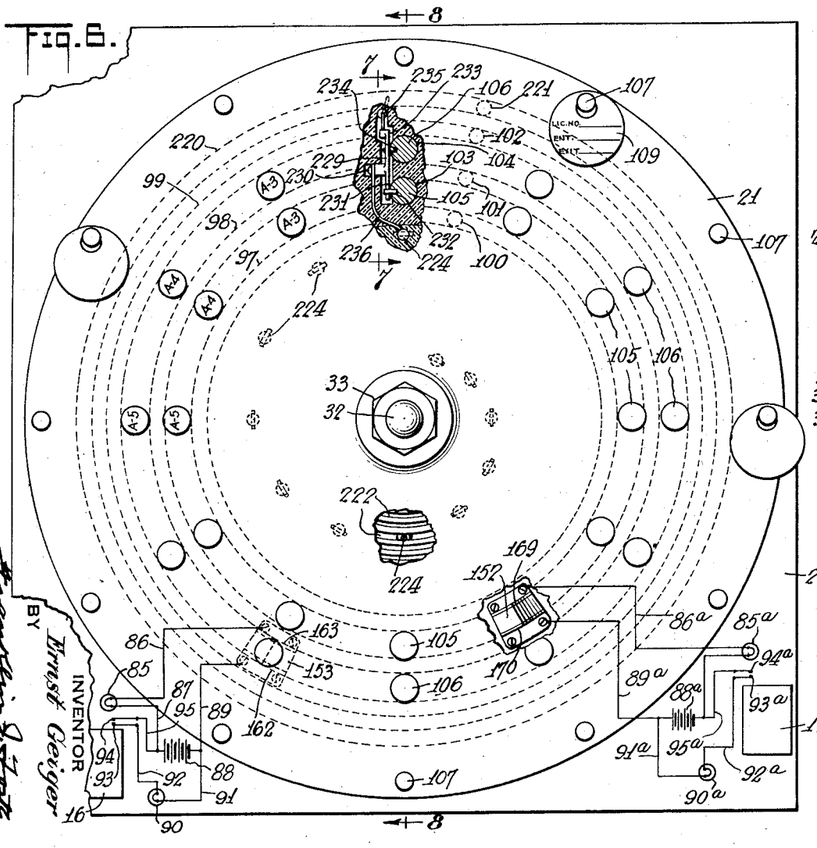
Fig. 6 is a somewhat diagrammatic view principally in elevation and partly in section of a further modified type of switch which is used to operate the recording mechanism.
Figures 7, 8:
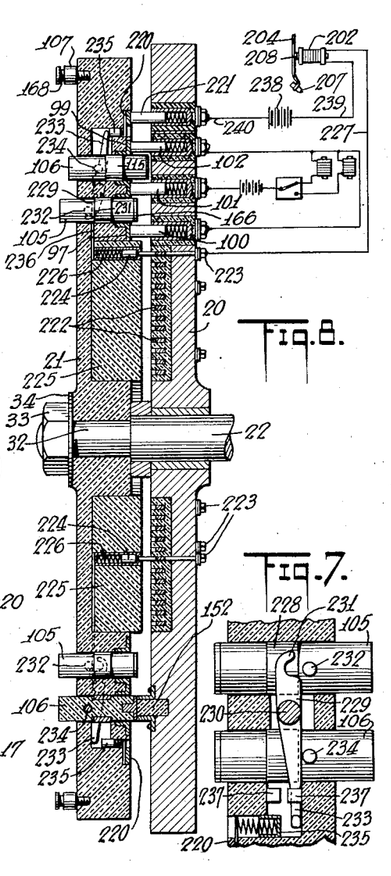
Fig. 7 is a transverse sectional view on the line 7—7 of Fig. 6.
Fig. 8 is a similar view on the line 8—8 of Fig. 6.

The master switch of Figs. 6 to 8 embodies substantially all of the structure of the switch of Figs. 4 and 5 but with structural additions for operating the time recording mechanism. Reference numerals from Figs. 4 and 5 and also from Figs. 2 and 3 have therefore been carried over and re-used wherever possible.

The plate 20 and movable disc 21 are retained, as are the three main contact annuli 97, 98, 99 with their brushes 100, 101, 102. The two concentric annular rows of "In" pushbuttons 105 and "Out" pushbuttons 106 close relay circuits as above described. The ramps 152, 153 serve to restore the pushbuttons and to control the signal circuits in the manner previously set forth.

Figures 9, 10:
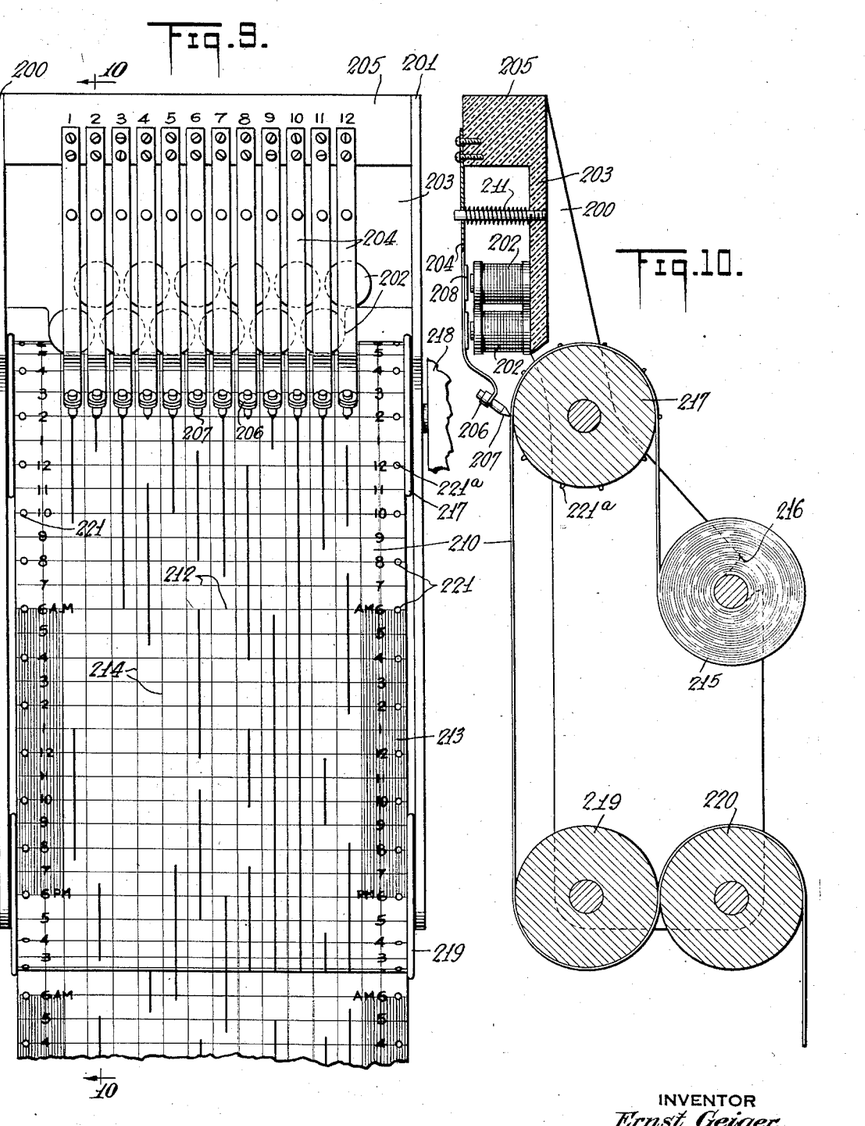
Fig. 9 is a front elevational view of the recording apparatus.
Fig. 10 is a vertical sectional view therethrough taken approximately on the line 10—10 of Fig. 9.

Before explaining the manner in which the master switch controls the recording mechanism reference will be had to the structural details of this mechanism itself (Figs. 9 and 10).

Mounted between suitable uprights or standards 200, 201 is an insulating block 203 upon which a series of solenoids 202 are secured. A similar number of flat spring arms 204 are secured at their upper ends on a rail 205 integral with block 203 and at their lower ends carry holders 206 for marking devices 207. Upon energization of any solenoid 202 its core attracts an armature 208 carried by associated arm 204 and acts to swing the marker 207 into operative engagement with a clock driven chart 210. Upon de-energization of solenoid 202 coiled expansion spring 211 moves the arm 204 outwardly and lifts the marker 207 off the record chart 210.

The chart is transversely ruled at 212 into time spaces which in the present instance are shown as hour rulings each having an hour legend marked at each end. The legends run in regular sequence, repeating every 12 hours and the night hour spaces from 6 p. m. to 6 a. m., for instance are distinguished from the day hour spaces by a colored margin 213 in the chart edge beside the night hour spaces. The chart is longitudinally ruled as at 214 to provide individual record columns for the individual cabins. The chart may be made in short lengths, pasted together as required but preferably is in the form of a very long tape or band wound on a supply roll 215 and capable of recording the business of the garage for months at a time without special attention. Each 24-hour section of the chart may be dated if desired and for bookkeeping, check-up or tabulating purposes the chart may subsequently be cut up into 24-hour sheets or lengths and filed away or may be stored in week, month or year lengths on filing rolls.

The supply roll with a suitable length of chart wound thereabout is dropped into suitable bearing notches 216 in the standards 200, 201, and the free edge of the chart is trained over a feed roll 217 driven from a clock or from other motor means the speed of which is accurately regulated, such means being shown diagrammatically as 218. The feed roll is journalled in standards 200, 201, as are a pair of take-up rolls 219, 220, one or both of which may be tensioned in any suitable manner (not shown) to hold the strip taut between rolls 219, 217.

The feed roll and chart are as wide as the battery of markers 207 and the roll 217 is properly allocated to bring each longitudinal column of the chart under its individual marker. Preferably the chart edges are apertured as at 221 for coaction with sprocket teeth 221a on the feed roll. The latter is driven to advance the chart one transverse space per hour and the chart is always backed by the feed roll when the markers engage it.

The electrical control of the markers is such that whenever an "In" pushbutton 105 is depressed a circuit through the solenoid 202 of a corresponding marker is completed and this marker is swung against the chart. This circuit remains closed until the "Out" pushbutton 106 for the particular cabin is depressed, whereupon the circuit is broken and the marker restored to its inoperative position. Meanwhile, as the chart has been advanced by the clock drive a line will have been drawn in the proper cabin column of the chart. The length of this line, read upon the hour marks at the edge of the chart shows the length of time the car has been stored and just which percentages of the time have been night hours and day hours. This is an important feature where charges are made on a time basis and the night and day charges vary. Obviously the 6 p. m. to 6 a. m. period has been selected as the night hour period purely arbitrarily and is subject to change to meet the requirements of individual garages.

The means for effecting electrical control of the markers from the pushbuttons includes a fourth member contact ring 220 arranged outwardly beyond the ring 99 and cooperating with a brush 221 fixed to the plate 20. The plate 20 also carries near its center a concentric series of circular contact rings 222, each of which is provided with a suitable terminal piece 223. The rings 222 correspond in number with the pairs of push-buttons 105, 106 and each ring 222 is arranged immediately under a brush 224 secured to the rear face of the disk 21, these brushes preferably being mounted in insulating block 225 fixed to the back of the disk. The brushes are pressed by coil springs 226 against the contact rings 222 and each terminal piece 223 is connected by a lead wire 227 to one side of its particular solenoid coil 202.

As best seen in Figs. 6, 7 and 8, the pushbuttons 105 and 106 are provided with laterally projecting studs 232, 234 at their intermediate portions and a switch lever 229 pivotally mounted on a pin 230 between the push-buttons includes a hooked end 231 adapted to be engaged by a stud 232 on the push button 105 and has its opposite end 233 in the path of a stud 234 on the pushbutton 106. The end 233 of the lever is adapted to engage a yielding contact 235 which is electrically connected to the ring 220. Any suitable means, such for instance as the spring clips 237 may be utilized for holding the switching lever 229 in either of its two extreme positions.

When the push button 106 is thrust inwardly as seen in Fig. 7 its pin 234 engages the lever 229 rocking it from the position of Fig. 7 to the position of Fig. 8 and swinging the lever end 233 against the contact 235 in which position the lever is retained by one of the spring clips 237. The extent of swinging movement of the lever and the influence of the button 106 is limited by the engagement of the lever end 231 with the pin 232. As this movement of the lever occurs a circuit is made through the proper solenoid 202. The circuit can be traced as follows: From a battery 238 through a lead 239 to the solenoid 202, thence through lead 227 to the terminal 223, rings 222, brush 224, lead 236, lever 229, contact 235, ring 220, brush 221, and lead 240 back to the battery.

The arrangement of the studs 232, 234 is such that a lost motion connection is provided when the push-button 106 is restored to its normally projected position. In other words, as the cam 152 pushes the button 106 rearwardly it will not affect the position of the switch lever 229. This lever will remain in the position of Fig. 7 and the energizing solenoid 202 for the marker 207 will consequently remain operative until such time as the outer push-button 105 is thrust inwardly, whereupon the action of the pin 232 on the end 231 of the lever 229 will restore this lever to the position of Fig. 6 and break the circuit at 233, 235, permitting the marker to be spring-thrust to inoperative position.

By virtue of this arrangement the normal operation of the master switch to bring storage cabins to receiving position and to discharging position automatically takes care of the recording mechanism upon which there is recorded a record of the total length of time and particular hours of the day or night during which each cabin has been loaded and permits an attendant to quickly compute the storage charges due on each car as it is delivered to the owner.

What I claim is:

1. The combination with a carriage and a driving means therefor of an electrical control mechanism including a stationary and a movable member, means to synchronize the speed of movement of said movable member with the speed of movement of the carriage, and to stop said member when the carriage stops, said control mechanism including a series of selectively operable switches mounted on one of the members and operative to cause the carriage to be set in motion by said driving means, and means carried by the other member to render the selected switch inoperative after the carriage has moved through a desired distance.

2. The combination with a carriage and a driving means therefor of an electrical control mechanism including a stationary and a movable member, means to synchronize the speed of movement of said movable member with the speed of movement of the carriage, and to stop said member when the carriage stops, said control mechanism including a series of selectively operable switches mounted on one of the members and operative to cause the carriage to be set in motion by said driving means, and means carried by the other member to automatically render the selected switch inoperative after the carriage has moved through a range predetermined by the selection of said switch.

3. In combination a power driven movable element and a power driven selector switch controlling said element, the switch including a stationary and movable member a plurality of selector devices mounted on one of the switch members each operative in one position to cause the movable controlled element to be set in motion, automatically acting means to throw the selected device out of operative position after the controlled element has moved through a range predetermined by such selection, and means to synchronize the movement of the controlling switch and the controlled element and to cause the switch to be started and stopped with the controlled element.

4. A power operated switch including a pair of cooperating members one stationary and the other movable, starter switches for setting the movable member in motion comprising selector means on one member and means on the other member cooperating with the selectors to complete a starting circuit and a single stop means on said other member for restoring any selected starter device and to open the power circuit after the members have relatively moved through a predetermined range.

5. A power operated switch including a pair of cooperating members one of them stationary and the other movable, starter switches for setting the movable member in motion comprising movable selector means on one member and means on the other member cooperating with the selectors to complete a starting circuit and a single means on said other member for restoring any selected starter device to open the power circuit after the members have relatively moved through a predetermined range, this range being predetermined by the distance of the selected starter device of one member from the stop means on the other member at the time of the operation of the starter device.

6. A switch including a pair of cooperating relatively movable switch disks, one of which is driven, a series of push buttons on one disk and contact means on the other disk coacting with the push-buttons to close starter circuits through the driving means of the switch and means on said last mentioned disk for restoring the push buttons after the members have been relatively moved through a predetermined range.

7. The combination with a motor of a controlling device including a movable element driven from the motor, a plurality of switching means carried by the controlling device selectively operable to start the motor and a single device for automatically stopping the motor after it has turned through a number of revolutions predetermined by such selection.

8. The combination with a motor of a control device driven from the motor, a plurality of switches on the control device selectively manually operable to close the starting circuit of the motor and a single automatic means to throw out the selected switch and stop the motor after the latter has turned through a number of revolutions predetermined by a selected switch.

9. The combination with a carriage and a driving means therefor of an electrical control mechanism including a pair of members one of which is fixed and the other of which is movable, means to synchronize the speed of relative movement of said members with the speed of movement of the carriage and to stop said member when the carriage stops, said control mechanism including a series of switches carried by the movable member operative in one position to cause the carriage to be set in motion by said driving means and in another position to cause the carriage to be stopped and automatic means on the fixed member for shifting a selected switch to carriage stopping position after said switch has been manually shifted to carriage starting position and the movable member moved through a predetermined range.

10. The combination with a carriage and a driving means therefor of an electrical control mechanism including a pair of members one of which is fixed and the other of which is movable, means to synchronize the speed of relative movement of said members with the speed of movement of the carriage and to stop said members when the carriage stops, said control mechanism including a series of switches carried by the movable member operative in one position to cause the carriage to be set in motion by said driving means and in another position to cause the carriage to be stopped and automatic means on the fixed member for shifting a selected switch to carriage stopping position after said switch has been manually shifted to carriage starting position and the movable member moved through a predetermined range, such range being predetermined by the original manual selection of the switch.

11. The combination with a carriage, a guide along which the carriage is movable and motor means to drive the carriage along its guide of a controlling device including means to cause the carriage to be driven and means to cause the carriage to be stopped, said controlling device including relatively fixed and relatively movable circuit making members, the relative movement of which is directly proportional to the speed of travel of the carriage, the controlling device including a plurality of selector means on the movable member operative to predetermine the range of movement of the carriage at the time the carriage is set in motion, and automatically acting means on the fixed member for coacting with any of said selective devices to stop the carriage.

12. An electrical control mechanism for conveying apparatus or the like, including a stationary member, a member movable relatively thereto and synchronized with the movement of the control mechanism, selectively operable switches on one of the members to close a circuit and initiate motion on the controlled apparatus and means on the other member to automatically stop the motion of the control mechanism and the controlled apparatus after a range of travel of the latter predetermined by said switch selection.

13. An electrical control mechanism comprising a stationary member, a member movable relatively to the stationary member and actuated by the controlled apparatus, selectable switch means on the movable member to start motion, and means on the stationary member to automatically render the switch means inactive and stop motion after a range of travel predetermined by said selection.

14. An electrical control mechanism comprising a stationary member, a member movable relatively to the stationary member, a plurality of selectively operable switch means on one of the members coacting with means on the other member to close an electrical circuit, and a single member on one of the members to automatically render any selected switch means inoperative after a predetermined range of motion.

15. The combination with a motor of a control device, including a stationary member and a member driven from the motor, switching means on the driven member selectively operable to start the motor and means for automatically stopping the motor after a number of revolutions predetermined by such selection.

16. The combination with a motor of a control device including a stationary member and a member driven from the motor, switching means carried by one of the members selectively operable to start the motor and means on the other member to automatically render the switching means inoperative and stop the motor after a number of revolutions predetermined by such selection.

17. The combination of a plurality of connected carriages, driving means for moving the carriages and a plurality of stop stations along the path of movement of the carriages with an electrical control mechanism including a stationary member, a member movable relatively to the stationary member and synchronized with the movement of the carriages, a plurality of selective switch means on the movable member corresponding to the carriages and coacting with means on the other member to start motion of the carriages and a single member to render any selected switch means inoperative and thereby stop its corresponding carriage automatically when it has arrived at a preselected stop station.

18. A conveying apparatus including an endless connected series of carriages, motor means to drive the carriage train, a cargo handling station with which any of the carriages are adapted to be aligned, a control mechanism comprising a stationary member and a member movable relatively to the stationary member and synchronized with the movement of the carriage train and a plurality of selective switching means on the movable member coacting with means on the other member to set the carriage train in motion and a single means coacting with any selective switch means to stop it automatically when a preselected carriage has arrived at the cargo handling station.

19. In a control device for circuitous elevators having a plurality of cages movable in an endless path, means movable in accordance with the movement of the cages, a plurality of operating means thereon, each for selecting a particular cage and registering a call therefor, stationary means for cooperating with said plurality of operating means when in an operated condition for effecting the movement of said cages, said operating means including means for effecting the stopping of said cages at any time.

ERNST GEIGER.